US009833904B2

(12) United States Patent
Verl

(10) Patent No.: US 9,833,904 B2
(45) Date of Patent: Dec. 5, 2017

(54) METHOD FOR ROBOT-ASSISTED MEASUREMENT OF MEASURABLE OBJECTS

(71) Applicant: KUKA Roboter GmbH, Augsburg (DE)

(72) Inventor: Alexander Verl, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/950,699

(22) Filed: Nov. 24, 2015

(65) Prior Publication Data

US 2016/0075029 A1    Mar. 17, 2016

Related U.S. Application Data

(63) Continuation of application No. 11/720,982, filed as application No. PCT/EP2005/004921 on May 6, 2005, now abandoned.

(30) Foreign Application Priority Data

May 17, 2004    (DE) .................. 10 2004 024 378

(51) Int. Cl.
*B25J 9/16*     (2006.01)
*G01B 21/00*    (2006.01)

(52) U.S. Cl.
CPC ........... *B25J 9/1684* (2013.01); *B25J 9/1692* (2013.01); *G01B 21/00* (2013.01);
(Continued)

(58) Field of Classification Search
CPC ....... B25J 9/1692; B25J 9/1684; G01B 21/00; G05B 2219/39042; G05B 2219/45061; Y10S 901/02
(Continued)

(56) References Cited

U.S. PATENT DOCUMENTS 4,753,569 A    6/1988  Pryor
4,754,415 A *  6/1988  George .................. B25J 9/1692
                                              348/121
(Continued)

FOREIGN PATENT DOCUMENTS

DE          19626459           1/1998
DE     EP 0963816 A2 * 12/1999 ............ B25J 9/1692
(Continued)

OTHER PUBLICATIONS

F. Bertagnolli, R. Dillmann; Proceedings of IEEE International Conference on Jul. 30-Aug. 1, 2003, "Flexible Automated Process Assurance Through Non-contact 3D Measuring Technology" Multisensor Fusion and Integration for Intelligent Systems, 2003.
(Continued)

*Primary Examiner* — Stephen Holwerda

(74) *Attorney, Agent, or Firm* — Wood Herron & Evans LLP

(57) ABSTRACT

A method for carrying out a robot-assisted measurement of measurable objects. The paths of a sensor are defined and transmitted to a robot co-ordinate system. The actual paths of the sensor guided on the robot are recorded. A plurality of measurable objects is measured, the sensor being guided with the robot along the actual paths. A compensating device makes it possible to compensate internal and/or external influences produced on the robot. The compensation stage is carried out after a determined number of measurements.

14 Claims, 4 Drawing Sheets

(52) U.S. Cl.
CPC ............ *G05B 2219/39042* (2013.01); *G05B 2219/45061* (2013.01); *Y10S 901/02* (2013.01)

(58) Field of Classification Search
USPC ............ 700/245, 253, 254, 259; 901/46, 47; 29/407.04; 250/559.33, 559.38
See application file for complete search history.

(56) References Cited

U.S. PATENT DOCUMENTS

| | | | |
|---|---|---|---|
| 4,788,440 | A | 11/1988 | Pryor |
| 5,380,978 | A * | 1/1995 | Pryor ................... B23K 26/032 219/121.64 |
| 5,987,591 | A * | 11/1999 | Jyumonji ............... B25J 9/1697 700/259 |
| 6,321,137 | B1 * | 11/2001 | De Smet ................ B25J 9/1692 700/245 |
| 6,374,158 | B1 | 4/2002 | Fusaro, Jr. |
| 2003/0144765 | A1 * | 7/2003 | Habibi ................... B25J 9/1697 700/259 |

FOREIGN PATENT DOCUMENTS

| | | |
|---|---|---|
| DE | 19931676 | 1/2001 |
| EP | 0312119 | 4/1989 |
| EP | 0963816 | 12/1999 |
| EP | 1189732 | 3/2002 |

OTHER PUBLICATIONS

European Patent Office; Search Report in International Patent Application No. PCT/EP2005/004921 dated Sep. 29, 2005.

\* cited by examiner

METHOD FOR ROBOT-ASSISTED MEASUREMENT OF MEASURABLE OBJECTS

CROSS-REFERENCE

This application is a continuation of U.S. patent application Ser. No. 11/720,982 filed Dec. 12, 2008 (pending), which is a National Stage of International Patent Application No. PCT/EP2005/004921 filed May 6, 2005 (expired), which claims the benefit of priority to German Application No. DE 10 2004 024 378.6 filed May 17, 2004 (now issued Patent No. DE 10 2004 024 378), the disclosures of which are expressly incorporated by reference herein in their entirety.

TECHNICAL FIELD

The present invention relates to a method for robot-assisted measurement of objects and relates to a device for carrying out the method of robot-assisted measurement of objects.

BACKGROUND

Although the method is usable for any robots for measuring, the present invention and the problems on which it is based will be explained in reference to an industrial robot for measuring vehicle body parts.

SUMMARY

Industrial robots are coming into general use in the automobile industry for measuring components, in particular vehicle body parts. These robots are equipped with a measuring system, optical for example, and can be used very flexibly for complicated measuring tasks, in particular at locations that are difficult to access.

Measuring an object with a moving sensor necessitates measuring the paths of the sensor, in order to obtain a point cloud of the measured object in a world coordinate system from the path and the image data of the sensor. For that reason, the quality of the measurement of the object is also influenced by the measuring quality or the reproducibility of the paths of the sensor.

EP 0 963 816 A2 contains a description of a method for compensating for kinematic changes of a robot. To that end, when first put into operation the robot is moved to a sufficient number of different first-time poses and is surveyed in them by external cameras. In ongoing operation the robot moves to these poses again, and a correction value for a robot control model is determined from a detected deviation of the poses currently moved to from the initial poses.

DE 102 35 905 AI contains a description of a method for mounting a workpiece on an object by means of a robot. The robot is determined at a reference position by a measuring system relative to the world coordinate system and is registered with an image processing system. In an operating phase, a deviation of the robot from the reference position is determined with the help of the image processing system. Based on the deviation, a correction vector for guiding the robot to the reference position is determined and transmitted to the robot control.

In DE 100 48 952 A1 a method is determined for recording initially unknown operating points by means of a sensing apparatus and with a plurality of sensors that are affixed to a location which is to be programmed, and a distance vector to the current position of a reference unit on the robot tool is determined.

EP 1 076 221 A2 describes a device for robot-controlled measuring of objects. The device comprises a robot with a robot control to guide a non-contact sensor that records image data of the surface of an object along the surface of the object. A position determining device determines the position of the non-contact sensor. A synchronization signal is sent both to the non-contact sensor and to the position detecting device, so that the non-contact sensor creates image data for each synchronization signal and the position determining device determines the position of the non-contact sensor for each synchronization signal. An image processing device determines the shape of the measured object from the two data sets that have been created.

The disadvantage of the device presented is that the position determining device is needed constantly. This is a disadvantage from the viewpoint of space requirements, as well as the costs of manufacturing such a device.

This problem is solved according to the invention by the method specified in claim 1.

The method according to the invention has the advantage over the known approach that the absolute coordinates of the paths of the robot-guided sensor only have to be determined once. After that the robot repeats exactly the same paths.

This results in new areas of application for robot-assisted measurement wherever the necessary precision of measurement could not be achieved in the past due to positioning errors of the robot and/or where a position detecting device installed in a fixed location could not be used because of the costs and the space requirement.

The idea underlying the present invention consists in employing a robot system with high repeating precision and measuring the paths of the sensor only one time in a world coordinate system. To that end, the necessary paths for the measuring are defined and are input into the robot control. The latter executes these paths, which are then measured in a world coordinate system. The path in the world coordinates is stored in an expedient manner in a suitable device in such a way that for every pose of the robot, while the sensor is guided along the path the coordinates of the sensor in the world coordinate system are readable from this device. To guide the sensor, a robot is used whose repeating precision is improved due to compensation from external and/or internal influences. That is done by performing a compensation after one or more measurements. A sensor analysis device determines a point cloud of the object being measured from the stored path in the world coordinates and the image data from the sensor.

The subordinate claims contain advantageous refinements of and improvements to the method specified in claim 1.

According to a preferred refinement, each time before or after the measurement of an object of measurement a compensation of the internal and/or external influences is performed. Thus every object of measurement is measured with constant precision.

According to a preferred refinement, the definition of the paths and/or the determination of the actual paths of the sensor guided on the robot is done by an external calibrating device.

According to a preferred refinement, the external calibrating device measures the positions of markings which are permanently or removably affixed to the sensor.

According to a preferred refinement, to define the paths of the sensor the object of measurement is measured by guiding the sensor manually and by determining the manually guided path of the sensor with the external position determining device during the measuring process. That makes it possible to save lengthy learning phases for the robot guidance system.

According to a preferred refinement, to define the paths of the sensor the sensor is manually uncoupled from the robot; or the sensor, coupled to the robot, is guided around the object of measurement by manual control.

According to the invention, to compensate for external and/or internal influences in order to increase the repeating precision, a reference body is measured with the sensor guided with the robot. The deviations of a measured point cloud from a previously measured point cloud of the reference body are used to adapt the robot control in such a way that the changes in the kinematics of the robot that resulted in the different point clouds are compensated for. The advantage is that high repeating precision is attained with this procedure, without need of an external sensor.

According to a preferred refinement, to determine the paths of the sensor guided with the robot and/or to define the paths of the sensor around the reference body the sensor is manually uncoupled from the robot, or the sensor, coupled to the robot, is guided by manual control around the reference body and the actual paths are recorded with the external position determining device. That makes it possible to save lengthy learning phases for the robot guidance system.

According to a preferred refinement, the ascertained actual paths of the sensor are adapted to the defined paths of the sensor. The paths do not have to be taken over exactly here, but rather it is possible to smoothen the hand-guided paths.

According to a preferred refinement, the robot is compensated against the external influence of temperature fluctuations on its repeating precision. That makes it possible to compensate advantageously for drifts in the positioning which arise due to the self-heating of the robot.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

The figures shown the following.

In the figures, the same reference labels designate the same or functionally equivalent components.

DETAILED DESCRIPTION

Figure 1:
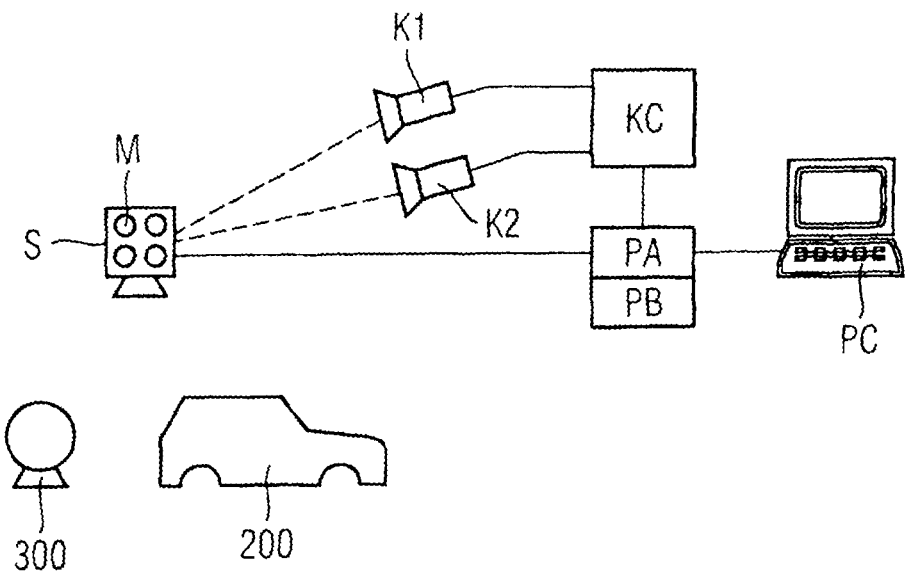
FIG. 1: a schematic depiction of a device for carrying out an initialization phase of an embodiment of the present invention.

FIG. 1 contains a schematic depiction of a device for carrying out an initialization phase of an embodiment of the present invention, with an object of measurement 200, a reference body 300, a non-contact sensor S, markings M which are affixed to sensor S, a sensor processing device PA, a sensor control device PB, an output terminal PC, a calibration device comprising one or more cameras K1, K2 and a camera control and interpretation device KC. The sensor S is guided manually around the object of measurement 200 and the reference body 300. The calibration device K1, K2, KC measures the positions of the markings M in a world coordinate system. The positions of the markings M which are affixed to the sensor S are used to determine the position and orientation of the sensor S, i.e. the path of the sensor S. The image data from sensor S are processed together with the path of sensor S by sensor processing device PA, and the calculated point cloud of the object of measurement 200 and of the reference body 300 are output immediately on the output terminal PC. This makes it possible to operate sensor S intuitively, since the user can recognize directly what effect the hand-guided path of sensor S has on capturing the point clouds of object of measurement 200 and reference body 300. The hand-guided path is saved, and serves later as the model for a robot-guided path.

The image data from sensor S are processed with the path of sensor S by assigning to each measuring point of the image data the position and orientation of sensor S which sensor S occupied to record that measuring point. The measuring points are recorded in the local coordinate system of sensor S; since this local coordinate system is moved together with the sensor, it is necessary to transform all the measuring points from the local to the fixed world coordinate system. This transformation between the two coordinate systems is based on the path of sensor S and basic geometric relationships.

Figure 2:
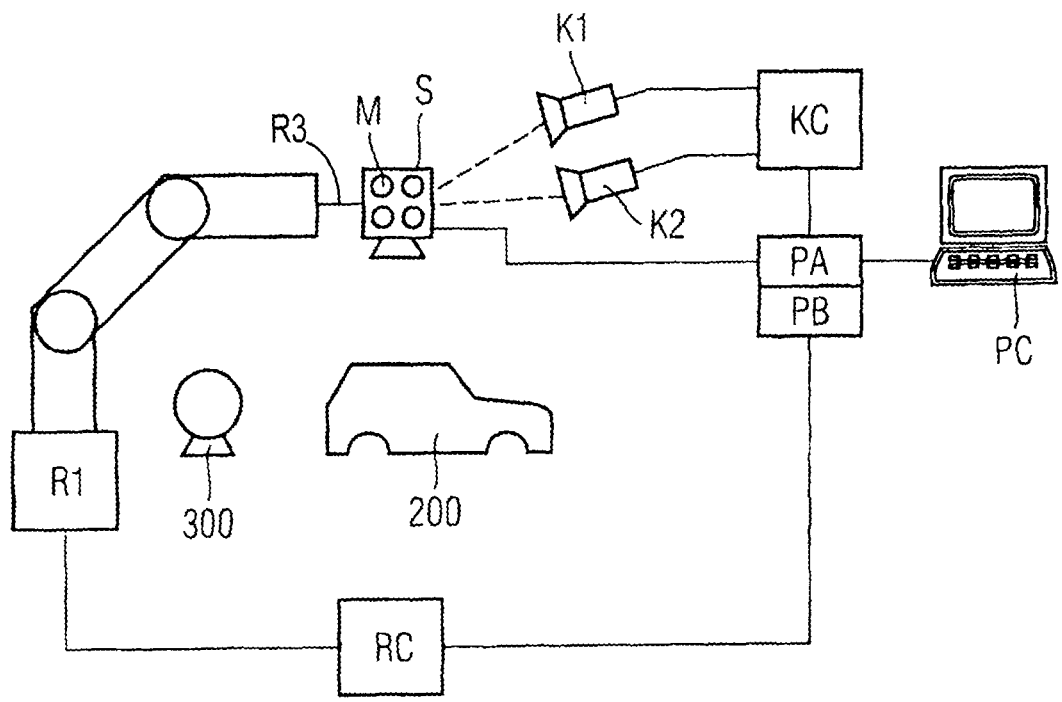
FIG. 2: a schematic depiction of a device for robot-assisted measurement.

FIG. 2 shows a schematic depiction of a device for robot-assisted measurement of object of measurement 200 and of reference body 300 with robot R1, to whose robot flange R3 sensor S is attached, and robot control RC. Robot control RC guides robot flange R3 along a path which is defined in robot control RC in the robot coordinate system. In the case of manual guidance, the path of sensor S is needed for processing the image data from sensor S. To that end, position determining device K1, K2, KC determines the path of sensor S.

The path of sensor S for measuring an object of measurement 200 and a reference body 300 can be gained in a plurality of ways. One method according to the invention is to guide the sensor S manually around object of measurement 200 and reference body 300, as depicted in FIG. 1, and to then use the manually guided path as the model for a robot-guided path. To do so, the manually guided path is transformed into a description in the robot coordinate system and the description is entered into the robot control RC. The manually guided path can still be corrected, for example in order to reduce fluctuations of the manually guided sensor S which are included in the recording of the manual guidance by smoothening the path. Otherwise the robot-guided path should conform to the recorded manually-guided path, insofar as the kinematics and the construction of the robot permit this.

There are a number of possibilities for determining the path of the robot-guided sensor S that corresponds to the image data from sensor S. One method is to determine the position and orientation of sensor S for each measuring point. However, this requires stationary installation of the position determining device K1, K2, KC. A second method is to utilize the positioning precision of robot R1 and to guide sensor S precisely along a predetermined path. This requires absolute positioning precision of the robot, which robots according to the present-day state of the art do not attain to a sufficient degree. The method according to the invention permits a third variant.

Figure 3:
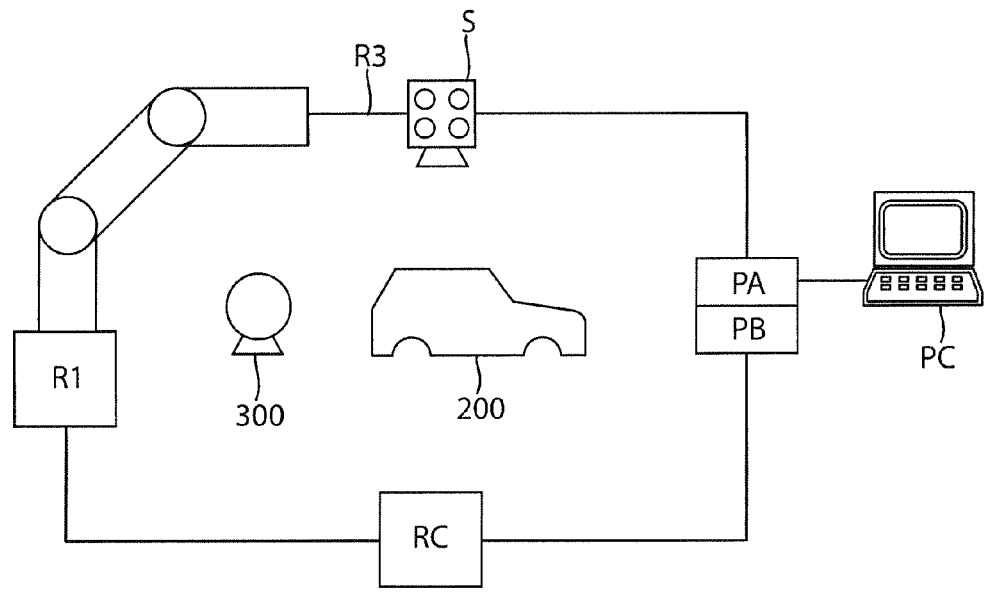
FIG. 3: a schematic depiction of the embodiment of the present invention.

FIG. 3 contains a schematic depiction of the embodiment of the present invention for measuring an object of measurement 200. This embodiment of the present invention utilizes a robot R1 with very high repeating precision through compensation for internal and/or external influences based on repeated measurement of the reference body 300. Then it is only necessary to precisely determine the path of sensor S once. The path is stored in a memory in suitable form and is recalled again from the memory for a later measurement of an object of measurement 200 to process the measurement data from sensor S, sensor S being guided along the same path for every object of measurement 200.

Figure 4:
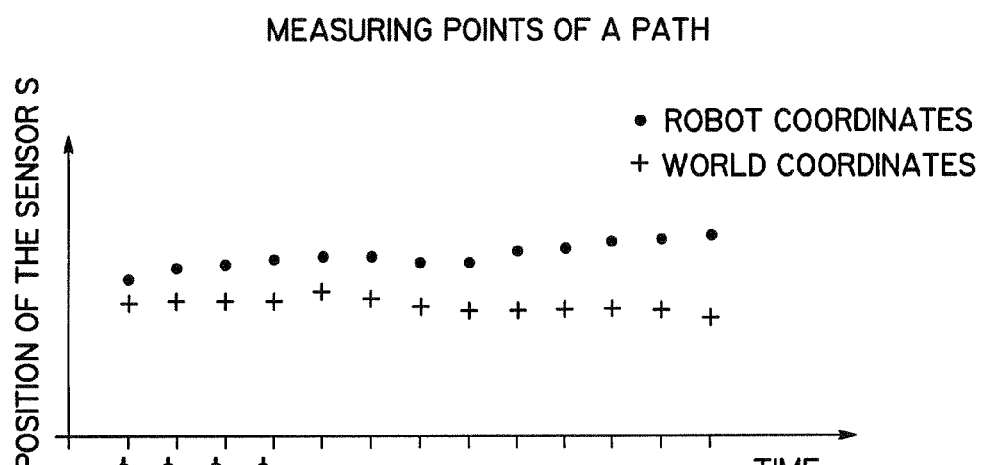
FIG. 4: a schematic depiction to explain a problem of assigning the positions of a path of the sensor S in robot coordinates to the real-world coordinates for every measuring point of the point cloud of the object of measurement.

The position and orientation of sensor S are assigned to the measuring points of a path by means of robot control RC. To that end, in this embodiment of the present invention the path is suitably recorded in a description in the world coordinates as well as in the robot coordinates of robot R1, and these two sets of data are stored as a graph, as depicted in FIG. 4. The robot control RC can output at any time where sensor S is located in the robot coordinate system. The sensor processing device PA requests the path of robot control RC for each measuring point of sensor S, and translates it into the world coordinate system by means of a previously determined table. This graph may consist of discrete points, or may depict a composite function that is obtained through appropriate interpolation of the measuring points.

An indispensable requirement for the method according to the invention is that the path must be replicated precisely. To that end a compensation step is performed regularly—in the case of this embodiment, before the measurement of every additional object of measurement 200. Reference body 300 is used for this. Reference body 300 is measured regularly. Reference body 300 is constructed in such a way that its dimensions do not change. If a different point cloud is obtained when measuring the reference body than in an original measurement, this is attributed solely to changes in the kinematics of the robot R1. The kinematics of the robot are subject to so-called internal influences, such as wearing of the joints, as well as to external influences, such as changes in the ambient temperature, which influence the dimensions of the robot R1. If a change in the kinematics is detected, the robot control RC is adjusted so that sensor S is again guided along the original path and the original point cloud of the reference body results. The adjustment of robot control RC thus also compensates for the changes in the kinematics of robot R1 on the path around object of measurement 200.

Figure 5:
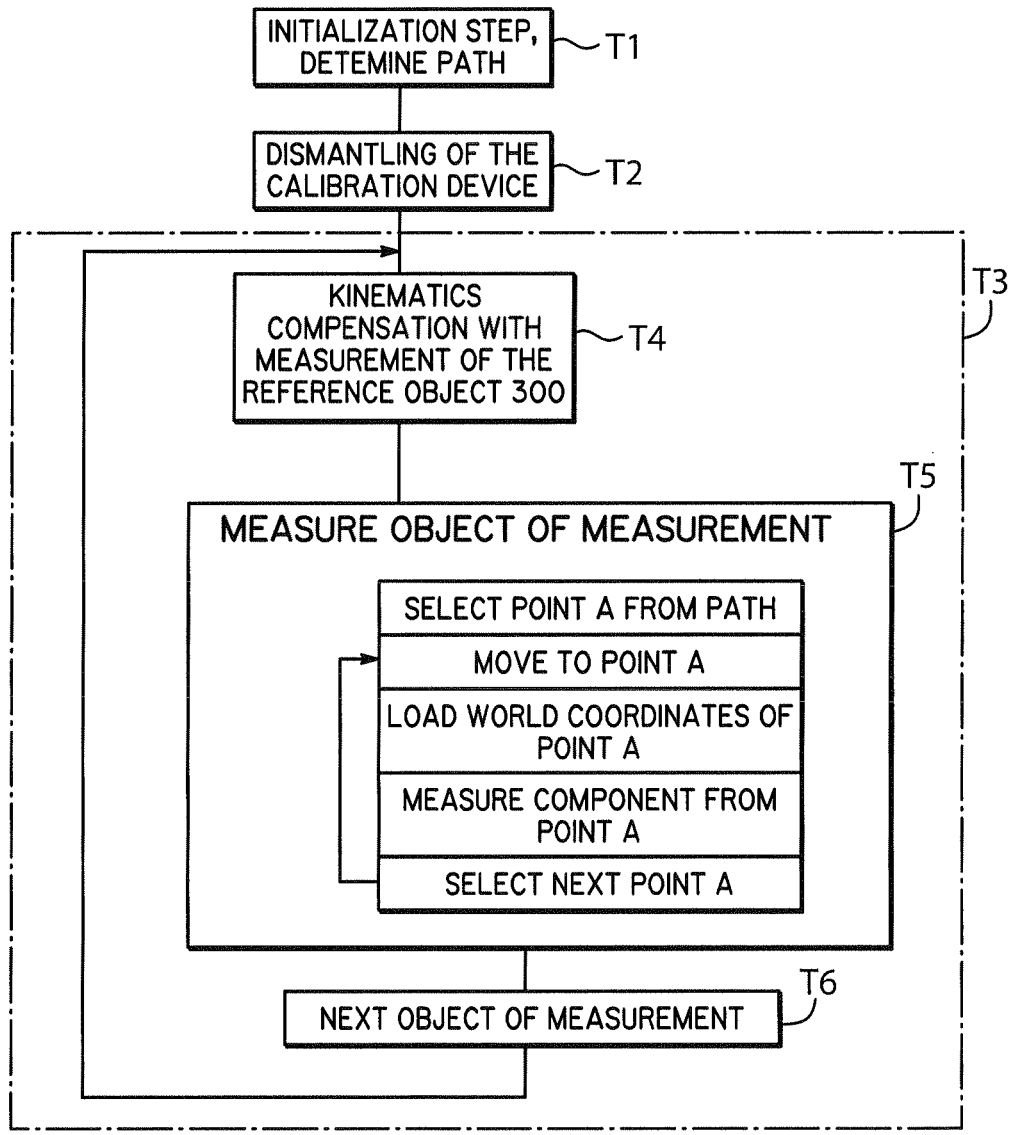
FIG. 5: a schematic depiction in flow-chart form of the steps of the embodiment of the present invention for robot assisted measurement of an object of measurement.

FIG. 5 contains a schematic depiction in the form of a flow chart of the embodiment of the present invention for robot-assisted measurement of an object of measurement 200. In an initialization phase T1 that will be explained later, an actual path of the robot-guided sensor S is determined and stored. After that has been done, the calibration device K1, K2, KC for determining the path of sensor S can be dismantled (T2) and used for other robots. Since this calibration device is very expensive, it is worthwhile to use it repeatedly. This is followed by the measurement phase (T3), during which the kinematics compensation step (T4) is first carried out, so that sensor S is always guided along the same stored actual path. An object of measurement 200 is then measured (T5), after which a next object of measurement 200 is made available for measurement (T6). During step T5 the robot travels to each point of the actual path in sequence, the world coordinates for each point A of the actual path are loaded from memory, and a measuring point of the object of measurement is recorded at the point A, so that the point cloud of object of measurement 200 is obtained.

Figure 6:
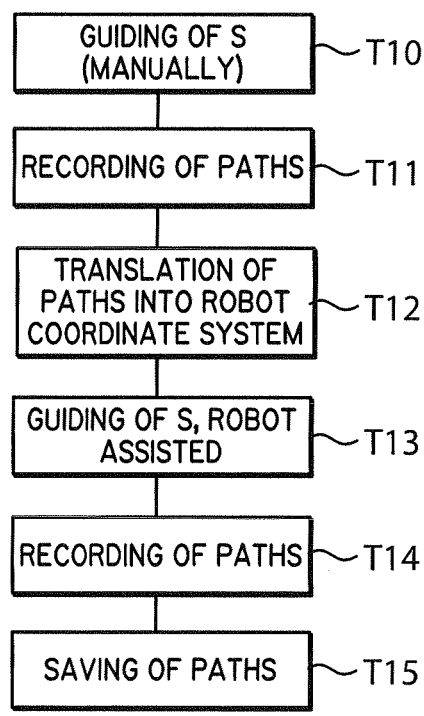
FIG. 6: a schematic depiction in flow-chart form of the steps of an embodiment of an initialization phase.

FIG. 6 depicts schematically the method for determining and defining the path in the form of a flow chart, which corresponds to an initialization phase T1. After guiding the sensor manually (T10) and recording the path of the sensor with the calibration device K1, K2, KC (T11), the path is translated to the robot coordinate system (T12). Fluctuations of the manually guided sensor S which were included in the recording during the manual guiding can be reduced by smoothening the path in step T12. Otherwise the robot-guided path should conform to the recorded manual path, insofar as the kinematics and the construction of the robot permit this. In step T13 sensor S is guided with robot assistance, and the actual path is recorded (T14). This robot-guided actual path is stored (T15). Since robot R1 has improved repeating precision, this actual path is now retraced with very good consistency in subsequent instances where the sensor is guided by means of the robot R1.

Although the present invention has been described above on the basis of one preferred exemplary embodiment, it is not limited to that embodiment, but is modifiable in many ways.

The description suggests the use of an optical sensor, such as a video camera. The present invention is not limited to that configuration; in addition to optical sensors, inductive or tactile sensors may also be used. The possibility of absolute positionability of the robot is advantageous for the two last-named sensors.

While the present invention has been illustrated by a description of various embodiments, and while these embodiments have been described in considerable detail, it is not intended to restrict or in any way limit the scope of the appended claims to such detail. The various features shown and discussed herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

| Reference labels | |
|---|---|
| 200 | object of measurement |
| 300 | reference body |
| S | sensor |
| PA | sensor evaluation device for S |
| PB | sensor control device for S |
| PC | output terminal |
| M | markings |
| K1, K2 | cameras |
| KC | camera control and interpretation devices |
| R1 | robots |
| R3 | robot flange |
| RC | robot control |

What is claimed is:
1. A method of measuring objects using a robot, the method comprising:
(a) initializing the robot by:
(1) defining paths of a sensor in a first coordinate system for measuring an object,

(2) translating the defined paths into a second coordinate system,
(3) determining actual paths of the sensor in the first coordinate system using an external calibrating device,
(4) recording a table of the actual paths of the sensor in the first and second coordinate systems, and
(5) removing the external calibrating device; and
(b) measuring at least one object by:
(1) measuring the at least one object by moving the sensor along the actual sensor path using the robot,
(2) periodically measuring a reference body with the external calibration device removed by moving the sensor using the robot to determine a point cloud,
(3) comparing the measured point cloud with a previously measured point cloud, and
(4) adjusting a robot control to compensate for changes in the kinematics of the robot based on the comparison of the point clouds.

2. The method of claim 1, wherein the reference body is measured to determine the point cloud each time the at least one object is measured.

3. The method of claim 1, wherein defining the paths of the sensor in the first coordinate system is accomplished by the external calibrating device.

4. The method of claim 3, wherein the external calibrating device measures the positions of markings that are affixed to the sensor.

5. The method of claim 3, wherein defining paths of the sensor in the first coordinate system includes manually guiding the sensor and determining the manually guided paths of the sensor with the external calibrating device.

6. The method of claim 5, further comprising:
manually uncoupling the sensor from the robot.

7. The method of claim 5, further comprising:
manually controlling the robot to move the sensor around the object to be measured.

8. The method of claim 1, wherein determining the actual paths of the sensor in the first coordinate system includes:
manually guiding the sensor and determining the manually guided paths of the sensor with the external calibrating device.

9. The method of claim 8, wherein manually guiding the sensor includes manually uncoupling the sensor from the robot.

10. The method of claim 8, wherein manually guiding the sensor includes manually controlling the robot to guide the sensor around the object.

11. The method of claim 1, further comprising:
defining the paths of the sensor around the reference body by manually guiding the sensor around the reference body and determining the manually guided paths of the sensor with the external calibrating device.

12. The method of claim 11, wherein manually guiding the sensor includes manually uncoupling the sensor from the robot.

13. The method of claim 11, wherein manually guiding the sensor includes manually controlling the robot to guide the sensor around the reference body.

14. The method if claim 1, wherein adjusting the robot control includes adjusting the table of actual paths of the sensor.

* * * * *